United States Patent [19]

Wang

[11] 3,905,886
[45] Sept. 16, 1975

[54] ULTRAFILTRATION AND ELECTRODIALYSIS METHOD AND APPARATUS

[75] Inventor: Donald G. J. Wang, Waukesha, Wis.

[73] Assignee: Aqua-Chem, Inc., Milwaukee, Wis.

[22] Filed: Sept. 13, 1974

[21] Appl. No.: 505,563

[52] U.S. Cl. .............................. 204/180 P; 204/301
[51] Int. Cl. ............................................ B01d 13/02
[58] Field of Search ........................ 204/180 P, 301

[56] References Cited
UNITED STATES PATENTS

| | | | |
|---|---|---|---|
| 3,661,762 | 5/1972 | Parsi | 204/301 |
| 3,663,406 | 5/1972 | Le Bras et al. | 204/181 |
| 3,766,039 | 10/1973 | Gilchrist | 204/301 X |
| 3,794,174 | 2/1974 | Booman et al. | 204/180 R X |

Primary Examiner—John H. Mack
Assistant Examiner—A. C. Prescott
Attorney, Agent, or Firm—Fred Wiviott

[57] ABSTRACT

A combination electrodialysis method and apparatus comprising ultrafiltration membrane cell pairs interposed between ion-selective membranes. The solution to be treated is fed to one side of the ultrafiltration membrane cell and an electric field is applied across the assembly. Ions of one polarity pass through one ion-selective membrane while ions of the opposite polarity pass through the ultrafiltration membrane and the other ion-selective membrane while the ultrafiltration membrane rejects the larger sized particles and/or molecules.

26 Claims, 1 Drawing Figure

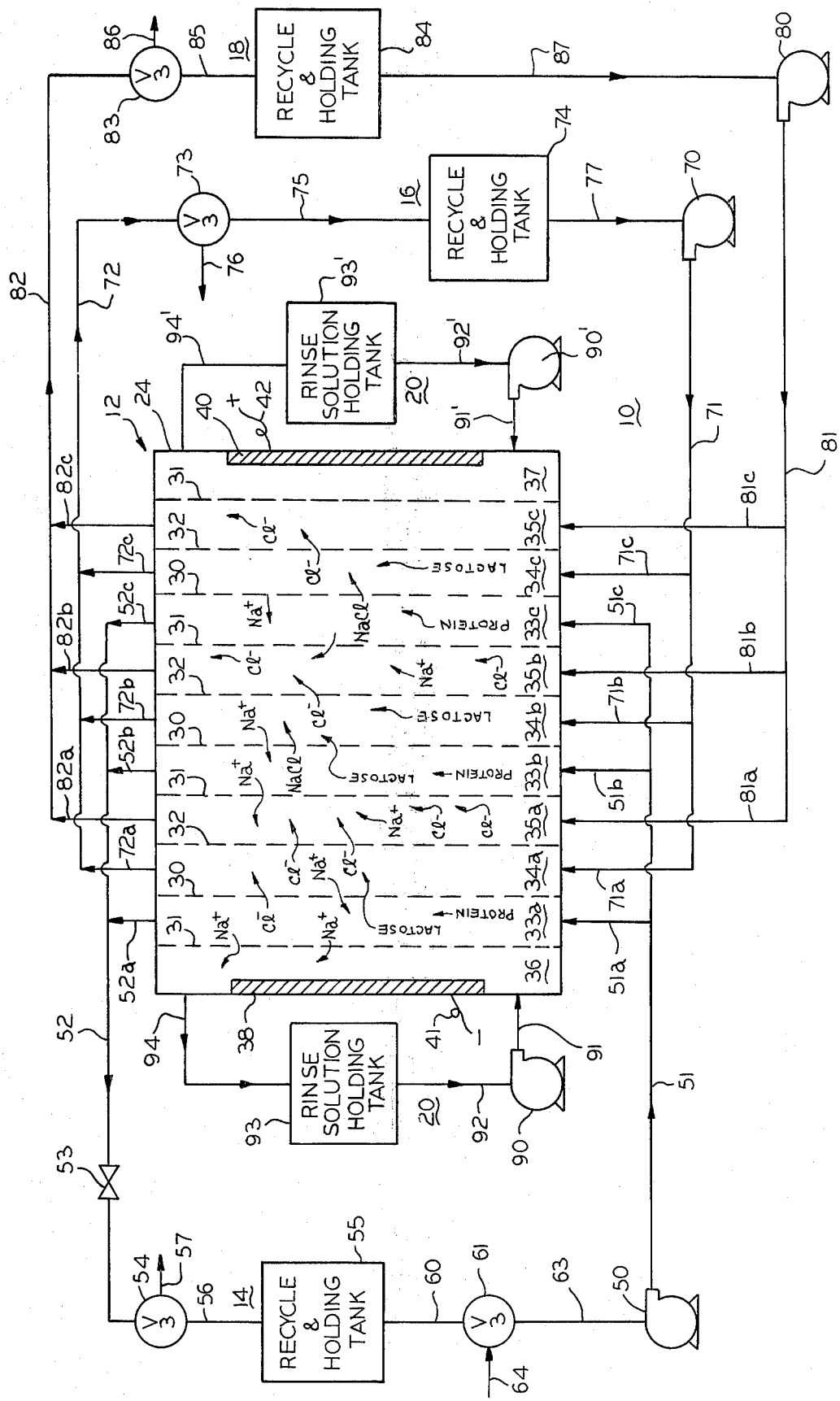

ULTRAFILTRATION AND ELECTRODIALYSIS METHOD AND APPARATUS

BACKGROUND OF THE INVENTION

This invention relates generally to the fluid purification arts of ultrafiltration and electrodialysis and in particular to a method and apparatus combining the two arts. Briefly, ultrafiltration involves the separation of large molecular weight materials from a feed solution by forcing the feed solution against a semi-permeable membrane under pressure. The large molecular weight materials are rejected by the membrane and become increasingly concentrated as carrier liquid is forced through the membrane, the latter being generally referred to as the ultrafiltration permeate.

Electrodialysis, on the other hand, involves separating ionic constituents of a solution by applying an electric field across an electrodialysis cell defined at least in part by ion-selective membranes. In a simple illustrative form, a solution to be demineralized is fed into a cell defined by a first anion-permeable, cation-impermeable membrane and a second cation-permeable, anion-impermeable membrane. Flanking this cell are additional cells containing an anode and a cathode respectively. When an electric field is applied across the separation cell, negative ions are drawn through the first membrane toward the cathode, while positive ions are drawn through the second membrane toward the anode, the initial feed solution being continually demineralized during application of the field. In practice, electrodialysis systems usually include a number of such cells in a cell pack and appropriate fluid transport systems are provided for supplying and recirculating solutions to the cells and removing waste concentrates.

The two processes just described have separately been employed in a number of fluid purification applications such as the demineralization of seawater and the separation and concentration of porteins from cheese whey. In addition, the processes are useful in the treatment of waste materials issuing from industrial plants.

Several problems, however, have prevented ultrafiltration and electrodialysis from reaching their full potential. One frequently encountered problem may be illustrated with reference to the separation of the various constituents of cheese whey. Whey contains relatively large quantities of valuable proteins and lactose. Whey also contains significant quantities of undesirable minerals, commonly referred to as ash. In prior attempts at utilizing electrodialysis to remove the ash from whey, rapid membrane failure, especially at the anion-permeable membranes, has been noticed. Such failure is caused by the protein molecules themselves which are negatively charged being drawn toward the cathode and into contact with the anion-selective membrane. Ultrafiltration of cheese whey, of course, does not result in ash removal, so that both the protein concentrate stream and the lactose permeate stream must be subjected to additional processing steps if ash removal is desired.

Similar problems to the ones that have been described in connection with cheese whey have been encountered in other applications. For example, valuable lignin and sugar fractions are found in the waste streams of paper processing plants. Purification of these otherwise recyclable materials is hindered by the acid constituents of such waste streams.

SUMMARY OF THE INVENTION

It is a primary object of the present invention to provide a method and apparatus for the combined electrodialysis and ultrafiltration of a feed solution containing both ionic and large molecular weight materials.

Another object of the present invention is to provide a combined electrodialysis and ultrafiltration system which will reduce ion-selective membrane failure and increase the useful life of such membranes.

A further object of the present invention is to provide a method and apparatus for simultaneously demineralizing concentrate and permeate ultrafiltration streams.

Yet another object of the present invention is to provide an electrodialysis system of increased current efficiency.

A still further object of the present invention is to provide a combination electrodialysis and ultrafiltration method and apparatus which may be employed for a variety of fluid demineralization, separation, concentration and purification applications.

How these and other objects of the present invention are accomplished will be described in detail in the ensuing specification taken in conjunction with the single FIGURE. Generally, however, in a preferred form, the invention includes providing a combination electrodialysis and ultrafiltration cell pack having ultrafiltration membrane cell-pairs interposed between a pair of ion-selective membranes. A solution to be concentrated and demineralized is fed under pressure to one side of the ultrafiltration membrane and an electric field is applied across the cell pack. Ions of one polarity will pass through a first ion-selective membrane adjacent the feed cell while oppositely charged ions penetrate the ultrafiltration membrane together with the ultrafiltration permeate. Finally, the latter ions will penetrate the other ion-selective membrane. Three separate process streams result from the system: a concentrated, demineralized feed solution; a demineralized permeate; and an ionic waste concentrate.

BRIEF DESCRIPTION OF THE DRAWING

The single FIGURE is a schematic diagram of an ultrafiltration-electrodialysis apparatus according to a preferred embodiment of the present invention.

DESCRIPTION OF THE PREFERRED EMBODIMENT

The single FIGURE schematically illustrates the filtration apparatus 10 according to the present invention to include a cell pack 12, an ultrafiltration injection, recirculation and product removal system 14, a permeate recirculation and removal system 16, an ionic waste recirculation and removal system 18 and electrode rinse systems 20 and 20'. It will be appreciated the apparatus illustrated in the drawing is exemplary and modifications thereof can be made without departing from the scope of the present invention.

Cell pack 12 includes a suitable non-conductive enclosure 24 adapted to support a plurality of planar membranes 30, 31 and 32 in parallel spaced relation therein. Enclosure 24 will not be described in detail as it is similar in design to those enclosures normally employed in electrodialysis cell packs. Membranes 30, 31 and 32 may be supported within enclosure 24 by suitable gaskets (not shown but which are also known to the art) to form a series of parallel cells 33a, 33b, 33c, 34a, 34b, 34c, 35a, 35b and 35c which are each defined by two of the membranes and the walls of enclosure 24. End cells 36 and 37 of cell pack 12 are each defined by a single one of the membranes 31 and the walls of enclosure 24. Disposed within end cell 36 is a suitable cathode 38 and an anode 40 is disposed in the opposite end wall 37. Cathode 38 and anode 40 are connected respectively to the negative and positive terminals of a suitable power source (not shown) through leads 41 and 42. Enclosure 24 also includes suitable couplings (not shown) for admitting and removing liquids from each of cells 33a, 33b, 33c, 34a, 34b, 34c, 35a, 35b, 35c, 36 and 37. Enclosure 24 differs from most prior art electrodialysis cell pack enclosures in that it must be capable of withstanding the pressures commonly employed in ultrafiltration, e.g., on the order of 10–100 pounds psi or more.

Membranes 30, 31 and 32 and their arrangement within enclosure 24 will now be described. Membranes 30 are ultrafiltration membranes; membranes 31 are cation-permeable, anion-impermeable membranes; and membranes 32 are anion-permeable, cation-impermeable membranes. With respect to the ion permeability of ultrafiltration membranes 30, it is essential that they be permeable to either positive or negative ions and preferably they are neutral membranes which are permeable to ions of either charge. A wide variety of suitable materials are known to the ultrafiltration and electrodialysis arts which may be used in the present invention. The primary criteria for ultrafiltration membranes 30 are the ion permeability just described and pore size selectivity. For each particular application, a membrane is selected which will reject the large molecular weight constituents to be concentrated. Membranes 31 and 32 are then selected after considering the water permeability, flow velocities, ionic rejection capabilites and the nature of the ionic constituents to be encountered in a particular job. All of the membranes, of course, must possess sufficient tensile strength to withstand ultrafiltration operating pressures.

A preferred material for use for ultrafiltration membranes 30 are microporous and anisotropic polyvinyl formal membranes on fabric supports. Such membranes and their method of preparation are disclosed in commonly assigned, copending application Ser. No. 178,407 filed Sept. 7, 1971 for "Polyvinyl Acetal Membrane" and a continuation-in-part application thereof, Ser. No. 478,848 filed June 13, 1974, which applications are expressly incorporated by reference herein. Such membranes are especially preferred for use in the present invention because they are capable of withstanding normal operating pressures, and because they can withstand repeated contact with acidic and caustic cleaning solutions, the use of which will be described below.

Suitable materials for use as membranes 31 and 32 include cation and anion exchange resins having active ion capture sites. Membranes 31 can be, for example, MC-3142 cation exchange membranes manufactured by Ionac Chemical Sybron Corporation, while membranes 32 can be, for example, MA-3148 ion exchange membranes available from the same source. Properties for these two membranes are set forth in the following Table I.

TABLE I

| Property | Membrane | |
|---|---|---|
| | MC-3142 | MC-3148 |
| Electrical Resistance (Ohm-cm$^2$) | | |
| 0.1N NaCl | 9.1 | 10.1 |
| 1.0N NaCl | 3.4 | 1.7 |
| % Permselectivity | | |
| 0.5N NaCl/1.0N NaCl | 94.1 | 90.0 |
| 0.2N NaCl/0.1N NaCl | 99.0 | 99.9 |
| Water Permeability | | |
| ml/hr/ft$^2$/30 psi | Negligible | Negligible |
| ml/hr/ft$^2$/10 psi | Negligible | Negligible |
| Thickness | 6 mils | 7 mils |
| Capacity | | |
| meq/g | 1.06 | 0.96 |
| meq/cm$^2$ | 0.021 | 0.019 |
| Dimensional Stability | Good | Good |
| Mullen Burst Strength (PSI) | 185 | 190 |

In the illustrated embodiment, membranes 31 form the membrane wall at each end chamber 36 and 37, and proceeding from the left to the right of the FIGURE, the membrane arrangement is 31, 30, 32, 31, 30, 32 . . . 31. Between end cells 36 and 37, and again proceeding from left to right in the FIGURE, are repetitive cell groups comprising a cell 33a, 33b or 33c defined by membrane 31 and a membrane 30 (hereinafter ultrafiltration concentration cell 33), a cell 34a, 34b or 34c defined by a membrane 30 and a membrane 32 (hereinafter ultrafiltration permeate cell 34), and a cell 35a, 35b or 35c defined by membranes 32 and 31 (hereinafter waste concentrate cell 35). The illustrated embodiment shows three such repetitive cell groups but any number may be employed ranging from 1 up to 50 or more. As an example, the membrane sheets may be 35 in. by 12 in. which provide an effective membrane area of 25 in.$^2$ per membrane when partially covered by suitable gaskets (not shown) in enclosure 24.

Referring now to fluid transport systems 14, 16, 18, 20 and 20', the ultrafiltration product injection, recirculation and removal system 14 may include a pump 50 for supplying liquid to be concentrated and demineralized to each of ultrafiltration concentration cells 33 through a first manifold pipe 51 having branch pipes 51a, 51b and 51c connected to cell 33a, 33b and 33c, respectively. At the outlet side of these cells, outlet pipes 52a, 52b and 52c are connected in turn to outlet manifold pipe 52. A suitable pressure regulator or valve 53 is connected into manifold 52 for adjusting the back pressure in ultrafiltration concentration cells 33. In addition, a three way valve 54 is connected to manifold 52 for selectively coupling the same to a holding tank 55 through pipe 56 or to a pipe 57 which is a discharge for demineralized, concentrated product. Holding tank 55 may also be connected by pipe 60 to a second three way valve 61 which is also connected to pump 50 through pipe 63 and to a source of raw feed through pipe 64. It will be appreciated that when valve 54 is set to couple pipe 52 to pipe 55 and when valve 61 is set to couple pipe 64 to pipe 63, the system is in a continuous mode. On the other hand, when valve 55 is set to couple pipe 52 to pipe 56 and valve 61 is set to connect pipe 60 to pipe 63, the system is in a recirculation mode.

Permeate recirculation and removal system 16 is similar to system 14 except that it does not include a pressure regulator valve or a second three way valve for addition of liquid to the system. A pump 70 circulates permeate through permeate cells 34a, 34b and 34c from inlet manifold pipe 71 having branches 71a, 71b and 71c, while permeate is removed from cells 34 by outlet branch pipes 72a, 74b and 74c which are connected to outlet manifold pipe 72. A three way valve 73 may connect manifold pipe 72 to a holding tank 74 through pipe 75 or to permeate discharge through pipe 76. Holding tank 74 is also connected to pump 70 by pipe 77. By a proper setting of valve 73, system 16 can be operated for discharge or recirculation.

Waste recirculation and removal system 18 includes a pump 80 for recirculating waste liquid to waste concentration cells 35a, 35b and 35c through inlet manifold pipe 81 having branches 81a, 81b and 81c, while further concentrated waste is removed from these cells by outlet manifold pipes 82a, 82b and 82c into outlet manifold 82. A three way valve 83 may connect manifold pipe 82, to holding tank 84 by pipe 85 and to waste by pipe 86. A pipe 87 also connects waste holding tank 84 to pump 80. Here again, the proper adjustment of valve 83 the system 18 can be set for discharge or recirculation.

The electrode rinse system 20 includes a pump 90, connected by an inlet pipe 91 to one end of cell 36 and by pipe 92 to a rinse solution holding tank 93, which in turn is connected by pipe 94 to the other end of cell 37. Rinse system 20' for cell 37 is identical and the same components are identified by the same reference numerals as in system 20 except that they are distinguished by a prime (').

The method of operation of filtration apparatus 10 can be advantageously described in connection with the demineralization and separation of proteins and lactose from cheese whey. For purposes of this description, it will be assumed that the ash content of whey is exclusively Na Cl−, it being realized that actually other ionic constituents are present in cheese whey. An electric field is initially applied between electrodes 38 and 40. For example, for the seven cell group of the illustrated embodiment using 3.5 × 12 inches membranes, voltages may range between 30–40 volts, at 1.5–3.5 amps, but these values should not be taken as limiting as suitable operating parameters will vary widely depending on the resistance of the entire cell pack 12. Raw whey is then introduced through pipe 64 into ultrafiltration product injection, recirculation and removal system 14 which in turn feeds the raw material by pump 50 in cells 33a, 33b and 33c at a pressure of 10–100 psi or more. The desired pressure is set by adjustment of pressure regulator 53. In each of cells 33a, 33b and 33c, sodium chloride, lactose and water will be forced through ultrafiltration membranes 30, sodium ions will pass back through membranes 30 and 31 toward cathode 38 but will be rejected by membrane 32 and the chloride ions will penetrate both membranes 30 and 32 toward anode 40, but will be rejected by membrane 31. The movement of sodium and chloride ions will result from electrodialytic rather than ultrafiltration forces. The rejections of sodium ions by membrane 32 and chloride ions by membrane 31 allows these ions to be removed through manifold 82. Protein is rejected by membranes 30 and is removed through manifold 52 and demineralized permeate containing lactose is withdrawn through manifold 72.

By appropriate adjustment of valves 54, 51, 73 and 83, the system can be run continuously. At the initial stages of the process, it may be desired to recirculate protein concentrate until desired solids and mineral levels are reached. This is accomplished by setting valves 54 and 61 in the recirculation mode. After the desired levels are reached, the entire bath of protein concentrate may be dishcarged through pipe 57, or valve 55 may be opened slightly to bleed product from the system through pipe 57. If the latter method is selected, total liquid volumes can be maintained in system 14 by adjusting valve 61 to admit corresponding volumes of raw whey. The same procedures may be followed in systems 16 and 18, with demineralized permeate (lactose) and waste concentrate being removed as desired. It is preferred to rinse electrode cells 36 and 37 continuously by passing a dilute sulphuric acid solution through the cells using electrode rinse systems 20 and 20'. Sodium sulphite may be substituted for the sulphuric acid and a number of additional electrode rinse compositions are known to the electrodialysis art.

It may also be desirable from time to time to thoroughly cleanse the membranes within cell pack 12 using membrane cleaning procedures known to the art. In one such procedure, the entire cell pack is rinsed with water, rinsed with a caustic cleaning solution, rinsed with water, rinsed with an acidic cleaning solution and again rinsed thoroughly with water at intervals which will depend on the types of feed solutions and products encountered. Because cheese whey provides such an excellent base for bacterial growth, it may be necessary to clean apparatus 10 daily when the system is being used for cheese whey separation. The cleaning solution may be introduced through system 14 or otherwise. Another cleaning procedure which is especially valuable for the ultrafiltration membrane cell pair comprises reversing the direction of flow periodically through cells 33 to remove accumulations of proteins at the surfaces of ultrafiltration membrane 30.

Table I shows that the water permeability of membranes 31 and 32 is negligible, and for this reason circulating solutions should be pumped through system 18 to carry ash from cells 35a, 35b and 35c. Again, suitable solutions can be chosen from those known to the electrodialysis art, one example being a 0.5 to 1.0% sodium chloride solution in distilled water. It is not necessary to employ additional fluids in system 16 as the ultrafiltration membrane is highly water pemeable under operating pressures.

While the illustrated embodiment has been described in connection with the demineralization and concentration of cheese whey proteins, the inventive concept is equally applicable to other systems. Paper processing plants produce large volumes of waste mixtures including lignin, sugars and acid. Such plants may employ the process to concentrate and de-acidify lignin in cells 33a, 33b and 33c, to separate and de-acidify sugars in cells 34a, 34b and 34c, and to concentrate the acidic components in cells 35a, 35b and 35c. Proper selection of membranes, operating voltages and injection pressures may readily be made after the components of the system are analyzed with respect to their molecular weights, ionic characteristics, etc.

Additionally, it is expected that the system will significantly increase the electrodialytic current efficiency by reducing ionic backflow which is encountered in ordinary electrodialysis cell packs. Such backflow is believed to be caused by ionic imbalances resulting from differences in ion mobilities through different ion selective membranes. If positive ions in any given system have a greater mobility toward the negative electrode than do negative ions toward the positive electrode, a depletion of positive ion results in increasing concentrations of negative ions which will eventually create a secondary field retarding further positive ion movement. The provision of two cells, i.e., 33 and 34, between anion and cation selective membranes in apparatus 10 produces a retardation of ionic flow leading to an increase in overall power efficiency. Ion-selective membrane failure is simultaneously reduced because the low water permeability of membranes 31 which form the other wall of the ultrafiltration concentration cells insures that the bulk of the liquid will pass through the ultrafiltration membrane and that proteins will accumulate on the ultrafiltration membrane side of the cell rather than adjacent membranes 31. Of course, throughout the process, fluids are circulated through the individual cells to avoid buildups of undesirable levels of protein adjacent any of the membranes.

While the invention has been described in connection with a particular preferred embodiment, the invention can be variously embodied and is to be limited solely by the claims which follow.

I claim:

1. The combination of:
   an enclosure including means for supporting a plurality of membranes disposed in spaced relation to form a plurality of filtration cells within said enclosure,
   electrode means disposed in spaced relation relative to the sides of said membranes, for supplying an electric field there across,
   at least a first one of said membranes being selective to ions having one charge and at least a second one of said membranes being selective to ions of an opposite charge, and
   an ultrafiltration membrane disposed between said ion selective membranes to define at least one ultrafiltration cell therebetween with one side of said first one of said membranes and a permeate collecting cell with the second one of said membranes,
   the other side of said first one of said membranes defining a marginal side of an electrode cell and
   means for delivering fluid under pressure to at least said ultrafiltration cells.

2. The invention set forth in claim 1 wherein a second one of said first ion selective membranes is supported ajdacent the other of said end walls to define a second electrode cell within said enclosure.

3. The invention set forth in claim 1 wherein said apparatus includes at least two ultrafiltration membranes and pairs of first and second ion selective membranes to define at least two of said ultrafiltration and permeate collection cells.

4. The invention set forth in claim 3 said membranes are arranged such that said ultrafiltration membranes are disposed between pairs of adjacent ion selective membranes with the membranes in each pair being selective to an ion of a different type wherein ion collection cells in said apparatus are formed between pairs of adjacent ion selective membranes and wherein at least said ultrafiltration cells include fluid inlet and fluid outlet means.

5. The invention set forth in claim 4 including means for adjusting the fluid pressure within said ultrafiltration cells and means for recirculating at least a portion of the fluid leaving the fluid outlet means of said ultrafiltration cells to the fluid inlet thereof.

6. The invention set forth in claim 5 further including means for selectively removing ultrafiltration concentrate from said recirculation means and for selectively introducing unconcentrated fluid to said ultrafiltration cells.

7. The invention set forth in claim 6 wherein said ultrafiltration membranes comprise anisotropic, microporous polyvinyl formal membranes.

8. The invention set forth in claim 4 wherein each cell within said enclosure includes fluid inlet and outlet means, further including means for circulating fluid into and out of each of said electrode, permeate, ultrafiltration and ion collection cells.

9. The invention set forth in claim 8 wherein said ultrafiltration membranes comprise anisotropic, microporous, polyvinyl formal membranes.

10. A filtration apparatus comprising:
    a. a fluid enclosure including $3N+1$ membranes supported in parallel spaced relation therein between opposite end walls thereof, N being a number between 1 and 10, the first, fourth and every third one thereafter of said membranes being selective to ions of a first charge, the second and every third one thereafter of said membranes being ultrafiltration membranes, and the third and every third one thereafter of said membranes being selective to ions opposite in charge from said first charge whereby a plurality of cells are defined within said enclosure comprising:
       i. ultrafiltration cells between adjacent ultrafiltration membranes and membranes selective to ions of a first charge,
       ii. permeate cells between adjacent ultrafiltration membranes and membranes selective to ions of said opposite charge,
       iii. ion collection cells between adjacent ion selective membranes, and
       iv. two cells defined by said end walls and the first and last one of said membranes selective to ions of said first charge;
    b. electrode means in said last named cells for supplying an electric field across the remainder of said cells, and
    c. means for introducing fluid to be concentrated and deionized into each ultrafiltration cell within said enclosure.

11. The invention set forth in claim 10 further including circulating means for continuously introducing and removing fluid from said ultrafiltration cells, said circulating means including means for regulating the fluid pressure within said cells and means for selectively discharging fluid leaving said cells from said apparatus and introducing additional fluid to be deionized and concentrated to said ultrafiltration cells.

12. The invention set forth in claim 11 including means for independently circulating fluids through each of said permeate, ion collection and end cells.

13. The invention set forth in claim 10 wherein said ultrafiltration membranes are anisotropic, microporous, polyvinyl formal membranes.

14. A filtration process comprising:
    providing a filtration system including at least one ultrafiltration cell pair which is defined by an ultrafiltration membrane being disposed between a pair of ion selective membranes, a first one of which is at least anion-permeable and the other of which is at least cation-permeable, applying an electric field across said cell pair, the cathode being arranged on the side of said housing said first ion-permeable membrane, and injecting a fluid to be simultaneously ultrafiltered and deionized under pressure into a first cell of said cell pair formed by said ultrafiltration membrane and one of said ion selective membranes, whereby ionic constituents of said fluid are drawn out of said cell pair toward one direction relative to said field and whereby permeate is forced through said ultrafiltration membrane into the second cell of said cell pair.

15. The invention set forth in claim 14 wherein said housing includes a plurality of said cell pairs and wherein said fluid is simultaneously injected into the first cell of each of said cell pairs.

16. The invention set forth in claim 15 wherein said ion-permeable membranes are substantially impermeable to the fluid injected into said first one of said cells of said cell pair and injecting fluid within said enclosure on the sides of said ion selective membranes opposite said ultrafiltration membranes.

17. The invention set forth in claim 15 comprising removing concentrated fluid from said first cells after ultrafiltration and deionization thereof and recirculating at least a part of said removed fluid back into said first cells.

18. The invention set forth in claim 15 wherein said ultrafiltration membranes include anisotropic, microporous, polyvinyl formal membranes.

19. The invention set forth in claim 15 wherein said fluid is cheese whey.

20. The invention set forth in claim 17 further including the steps of removing a portion of the concentrated and deionized fluid from the filtration system and simultaneously adding fresh fluid to be ultrafiltered and deionized to maintain the liquid volume in the system substantially constant.

21. The combination of:

an enclosure including means for supplying a plurality of membranes in spaced relation, electrode means in spaced relation on opposite sides of said membranes for providing an electric field there across, at least one of said membranes being selective to ions having one polarity and at least a second one of said membranes being selective to ions having an opposite charge, an ultrafiltration membrane disposed adjacent at least one of said ion selective membranes, and pressure means for delivering the fluid to be treated to the gap between at least two of said membranes.

22. The combination set forth in claim 1 and including feed liquid circulating means coupled to said enclosure at spaced apart points between said membranes.

23. The combination set forth in claim 1 wherein said ultrafiltration membrane is disposed between said ion selective membranes.

24. The combination set forth in claim 21 and including a first group of said membranes selective to ions having one polarity and a second group of said membranes selective to ions having an opposite polarity and a third group of said membranes being ultrafiltration membranes, the membranes of said first and second groups of membranes being disposed in alternating spaced apart relation, the ultrafiltration membranes being disposed between at least some of the membranes of said first and second groups.

25. The combination set forth in claim 24 wherein said membranes are generally planar and disposed in a generally parallel relation.

26. The combination set forth in claim 25 wherein one of the membranes of said first group is disposed adjacent one end of said enclosure and one of the membranes of said second group being disposed adjacent the other end of said enclosure, said electrode means comprising a pair of electrodes one of which is disposed adjacent each end of said enclosure.

* * * * *

UNITED STATES PATENT OFFICE
CERTIFICATE OF CORRECTION

Patent No. 3,905,886      Dated September 16, 1975

Inventor(s) Donald G. J. Wang

It is certified that error appears in the above-identified patent and that said Letters Patent are hereby corrected as shown below:

Claim 1, Column 7, line 27, cancel "filtration";
                         line 44, change "cells" to --cell--.

Claim 14, Column 8, line 64, cancel "being".

Claim 22, Column 10, line 14, cancel "1" and substitute --21--.

Claim 23, Column 10, line 17, cancel "1" and substitute --21--.

Signed and Sealed this third Day of February 1976

[SEAL]

Attest:

RUTH C. MASON
*Attesting Officer*

C. MARSHALL DANN
*Commissioner of Patents and Trademarks*